(12) United States Patent
Fritz

(10) Patent No.: US 12,727,539 B2
(45) Date of Patent: Sep. 8, 2026

(54) ATTACHMENT ASSEMBLY FOR ATTACHING LANDSCAPING DEVICES TO VEHICLES

(71) Applicant: Ronald W. Fritz, Lancaster, PA (US)

(72) Inventor: Ronald W. Fritz, Lancaster, PA (US)

( * ) Notice: Subject to any disclaimer, the term of this patent is extended or adjusted under 35 U.S.C. 154(b) by 357 days.

(21) Appl. No.: 18/521,527

(22) Filed: Nov. 28, 2023

(65) Prior Publication Data

US 2025/0169398 A1 May 29, 2025

(51) Int. Cl.
*A01D 43/16* (2006.01)

(52) U.S. Cl.
CPC .................................... *A01D 43/16* (2013.01)

(58) Field of Classification Search
CPC ................................ A01D 43/16; A01D 42/00
See application file for complete search history.

(56) References Cited

U.S. PATENT DOCUMENTS 4,187,577 A 2/1980 Hansen et al.
4,243,342 A 1/1981 Marto
4,700,534 A 10/1987 Reilly
5,284,007 A 2/1994 Poe et al.
5,694,752 A 12/1997 Warfield, III
5,746,045 A 5/1998 Haney
6,966,168 B1 11/2005 Kerr, Sr.
6,986,238 B1 1/2006 Bloodworth
7,028,455 B1 4/2006 Liguras
7,047,592 B2 5/2006 Sing et al.
7,240,891 B2 7/2007 Hafendorfer
7,712,293 B1 5/2010 Recker
8,322,121 B1 12/2012 Marcell
8,387,205 B2 3/2013 Weihl et al.
9,603,303 B2 3/2017 Hoppel
10,966,370 B1 4/2021 Clark
11,565,749 B1 * 1/2023 Womack .............. A01D 75/008
2010/0223897 A1 9/2010 Mills
2015/0101302 A1 4/2015 Cooper
2022/0007579 A1 * 1/2022 Guarniere .............. A01D 43/16
2023/0046916 A1 * 2/2023 Bischof .................. A01D 34/84

FOREIGN PATENT DOCUMENTS

WO 0011354 A1 3/2000

* cited by examiner

*Primary Examiner* — Brad Harcourt
(74) *Attorney, Agent, or Firm* — Barley Snyder

(57) ABSTRACT

An attachment assembly for attaching a blower to a mower includes a plate fixed to the blower. The plate has a plate pin attached to the plate and extending from the plate. The attachment assembly also includes a bracket having a bracket body attached to a frame of the mower. The plate pin is releasably connected to the bracket body in an open attached position. The plate is pivotable with respect to the bracket about a vertical axis and about a horizontal axis extending perpendicular to the vertical axis in the open attached position.

17 Claims, 7 Drawing Sheets

ATTACHMENT ASSEMBLY FOR ATTACHING LANDSCAPING DEVICES TO VEHICLES

FIELD OF THE INVENTION

The present invention relates to an attachment assembly and, more particularly, to an attachment assembly for attaching a blower to a mower.

BACKGROUND

Riding lawn mowers are operated by numerous residential and commercial users. A riding lawn mower often has a deck with a cutter for cutting plants as well as a vacuum for collecting plant debris. While the riding lawn mower is efficient at cutting various plants in open lawns and fields, it is not adept at cutting plants that are near lawn edges or objects such as fences, gates, and walls. As such, when there is a lawn edge or object, landscaping devices such as string trimmers and blowers are often used in lieu of the riding lawn mower. However, using the landscaping devices takes longer than if the riding mower alone could be used, and/or requires additional users to operate the landscaping devices while another user operates the riding lawn mower, thereby resulting in inefficient use of time and labor.

SUMMARY

An attachment assembly for attaching a blower to a mower includes a plate fixed to the blower. The plate has a plate pin attached to the plate and extending from the plate. The attachment assembly also includes a bracket having a bracket body attached to a frame of the mower. The plate pin is releasably connected to the bracket body in an open attached position. The plate is pivotable with respect to the bracket about a vertical axis and about a horizontal axis extending perpendicular to the vertical axis in the open attached position.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
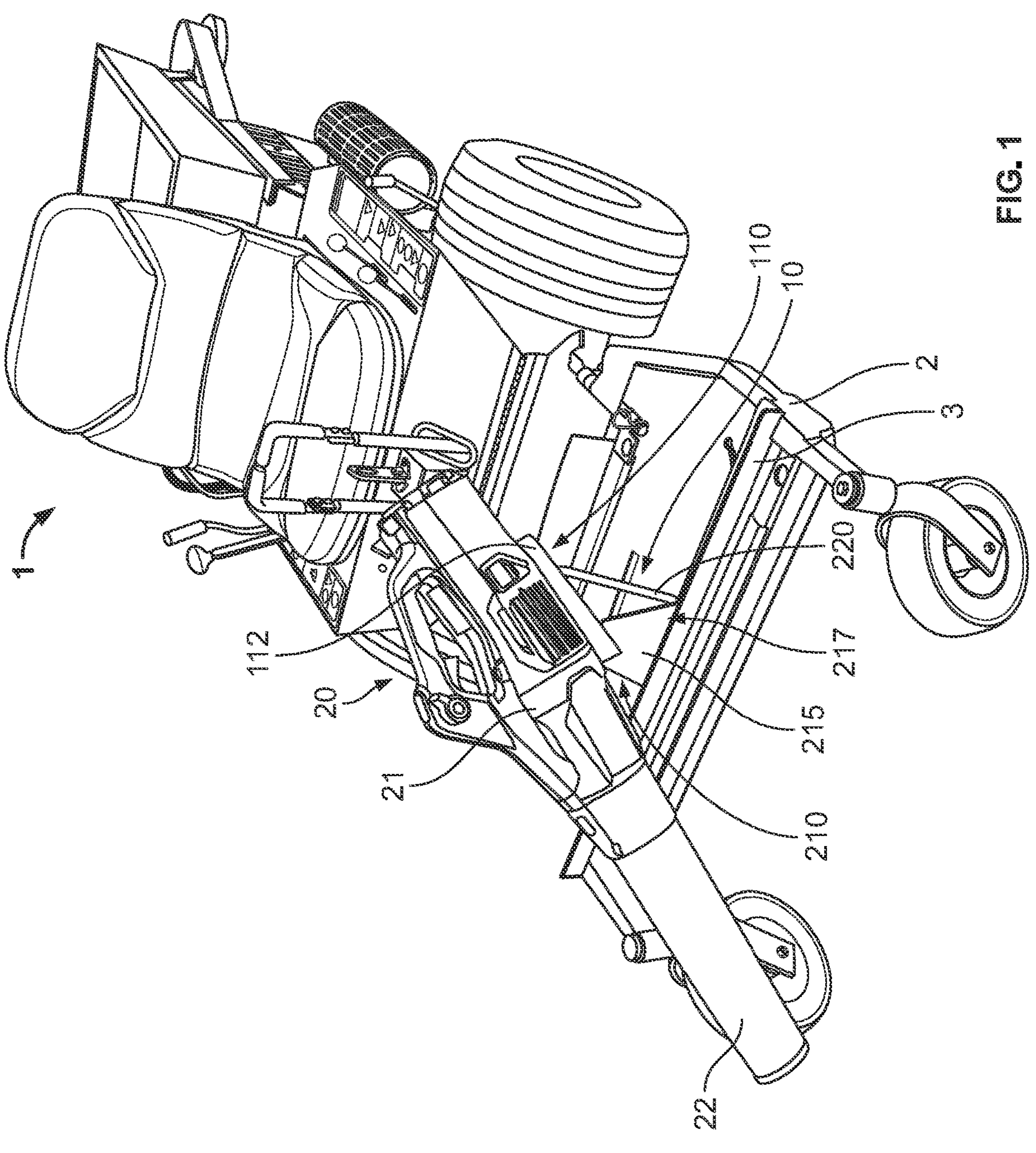
FIG. 1 is a plan view of an embodiment of an attachment assembly according to an embodiment attaching a blower to a mower.
Figure 2:
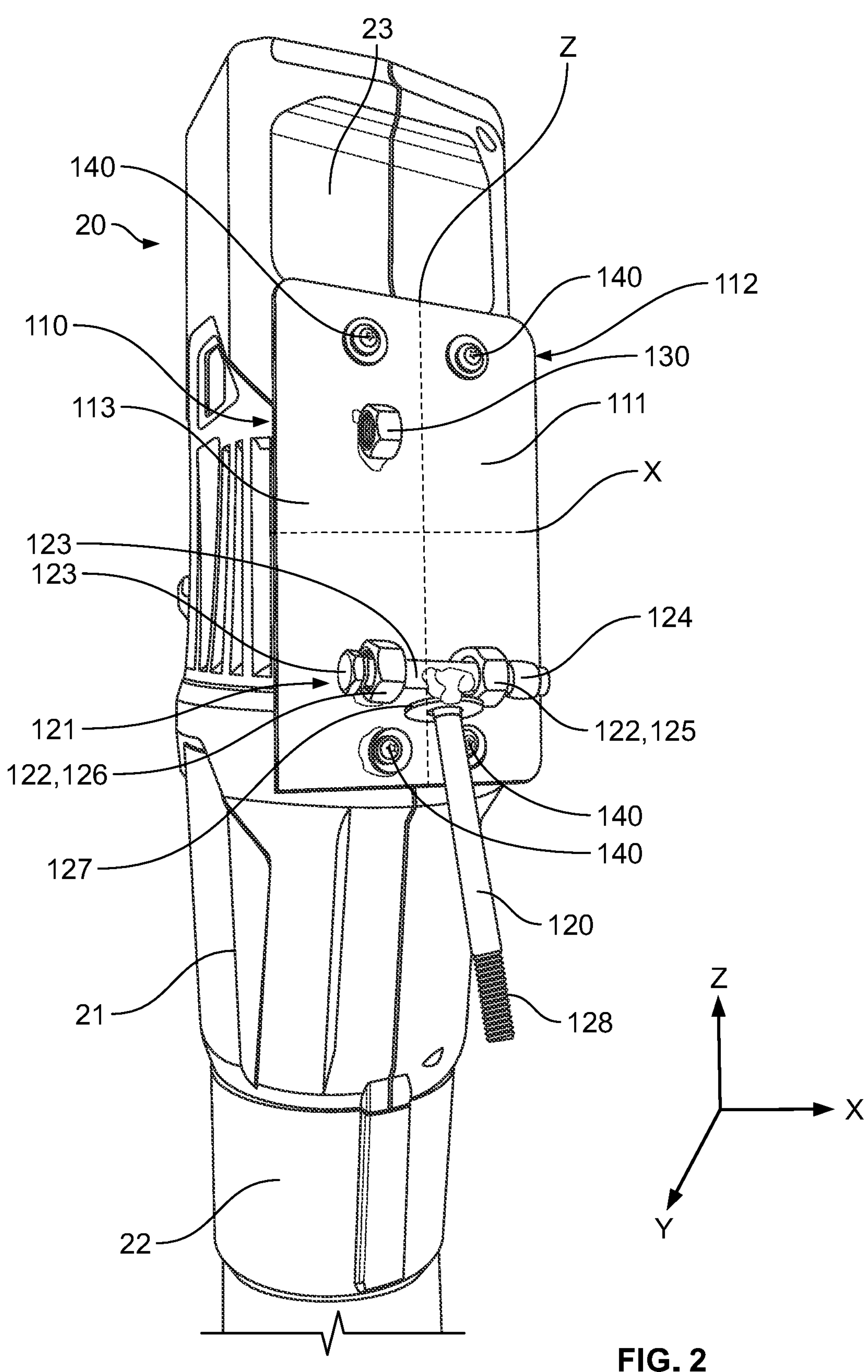
FIG. 2 is a perspective view of a plate of the attachment assembly attached to the blower.
Figure 3:
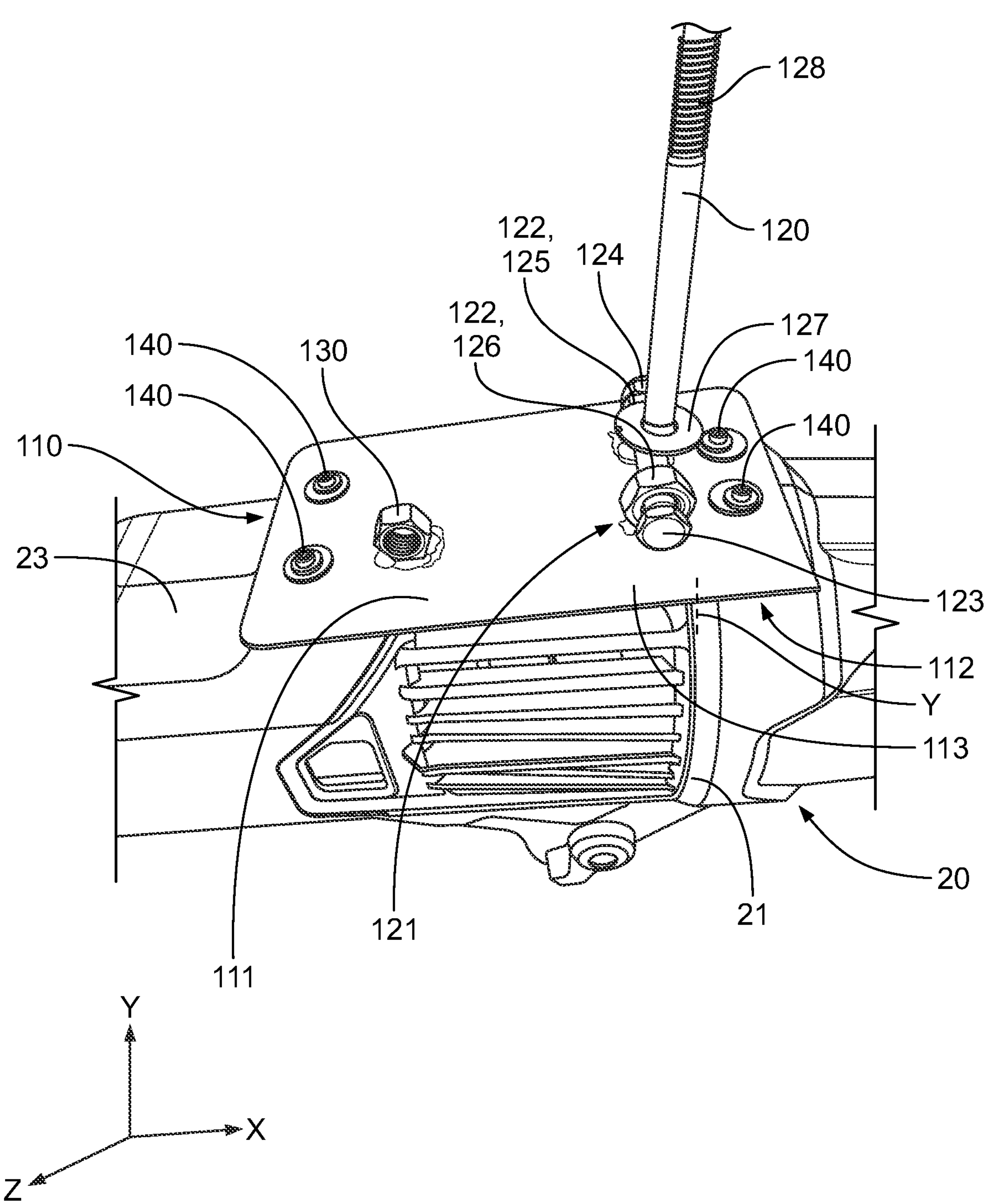
FIG. 3 is another perspective view of the FIG. 2 attachment between the plate of the attachment assembly and the blower.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will convey the concept of the invention to those skilled in the art.

Throughout the specification, various terms are used to describe connections between various elements. The terms used to describe connections between various elements throughout the specification are defined as follows: (1) the term "fixedly attach", or any iteration thereto, is intended to mean elements are attached to one another in a way that would cause them to be damaged if they are taken apart; (2) the term "releasably connect", or any iteration thereto, is intended to mean elements are connected or attached to one another in a way that the connection or attachment is secure but the elements are capable of being taken apart without either element sustaining any damage; and (3) the term "threadably connect", or any iteration thereto, is intended to mean one element has an exterior thread that is threadable into another element with a corresponding interior thread, and the elements are connected or attached to one another in a way that would allow them to be taken apart without either element sustaining any damage.

Throughout the specification, the term "heat weld" is used to indicate elements are fixedly attached to one another with a weld made by one of the following types of welding processes: (1) Gas Metal Arc Welding "GMAW/MIG"; (2) Gas Tungsten Arc Welding "GTAW/TIG"; (3) Shielded Metal Arc Welding "SMAW"; and (4) Flux Cored Arc Welding "FCAW".

An attachment assembly 10 according to an embodiment of the invention is shown in FIGS. 1-6. The attachment assembly 10 can be attached to various motorized vehicles including, but not limited to, riding lawn mowers, all-terrain vehicles, utility task vehicles, utility terrain vehicles, recreational off-highway vehicles, multipurpose off-highway vehicles, and golf carts. The attachment assembly 10 can also be attached to push lawn mowers as well as non-motorized vehicles. While the attachment assembly 10 can be attached to various types of lawn mowers and vehicles, for ease of understanding, the attachment assembly 10 will be described with reference to a riding lawn mower 1 (hereinafter the "mower" 1).

Figure 4:
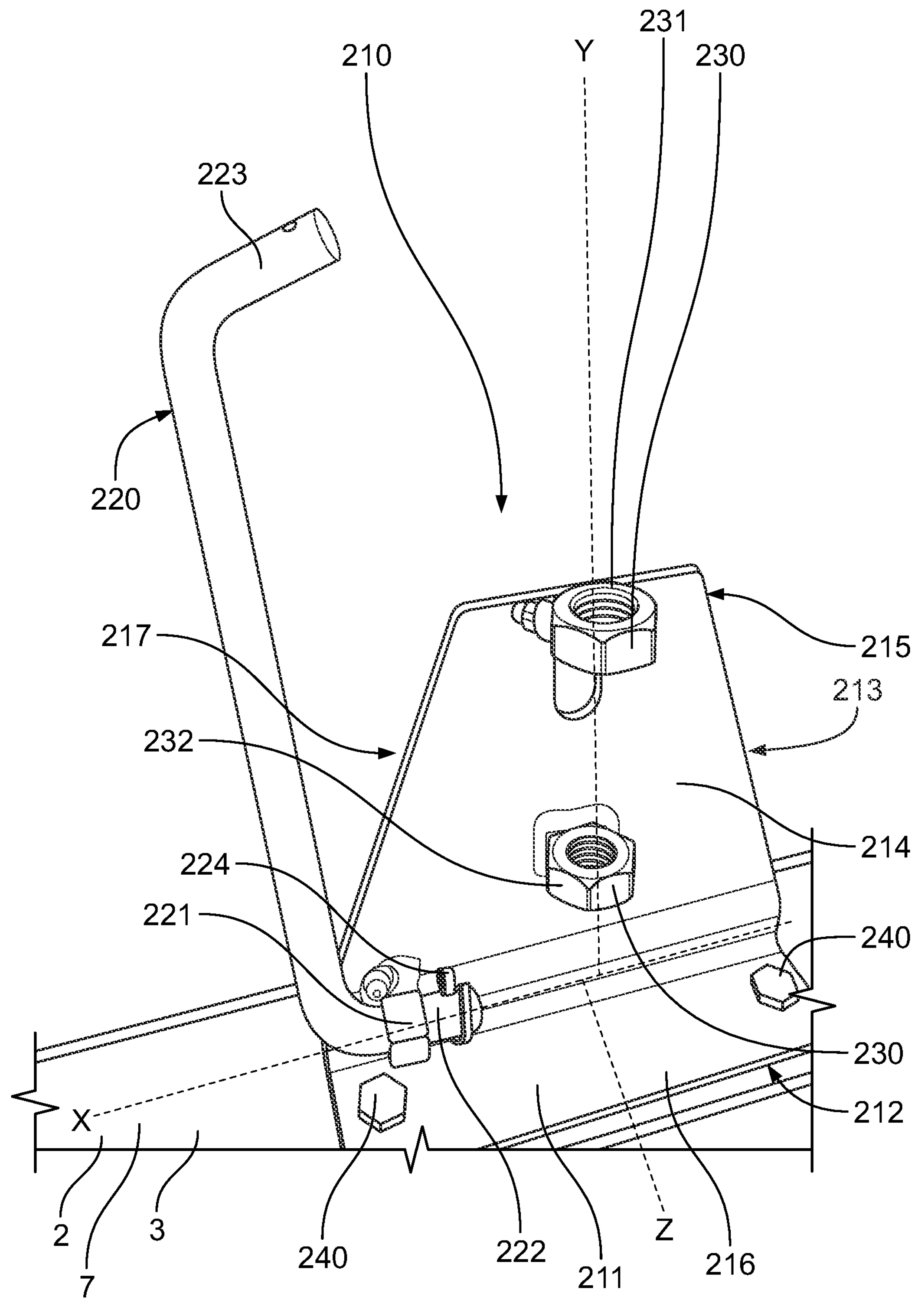
FIG. 4 is a plan view of the attachment between a bracket of the attachment assembly and the mower.
Figure 5:
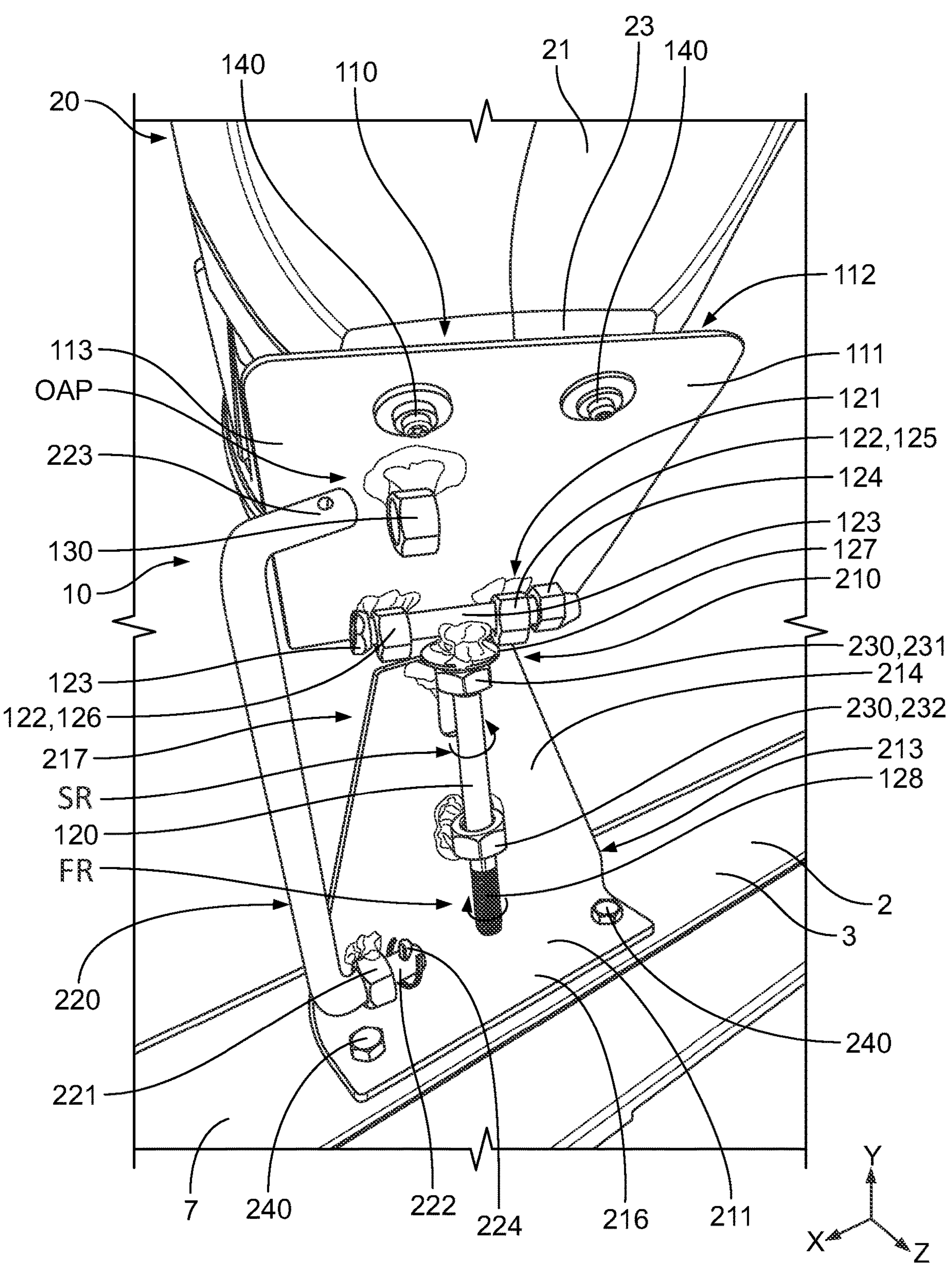
FIG. 5 is a detailed perspective view of the attachment assembly attaching the blower to the mower in an open attached position.
Figure 6:
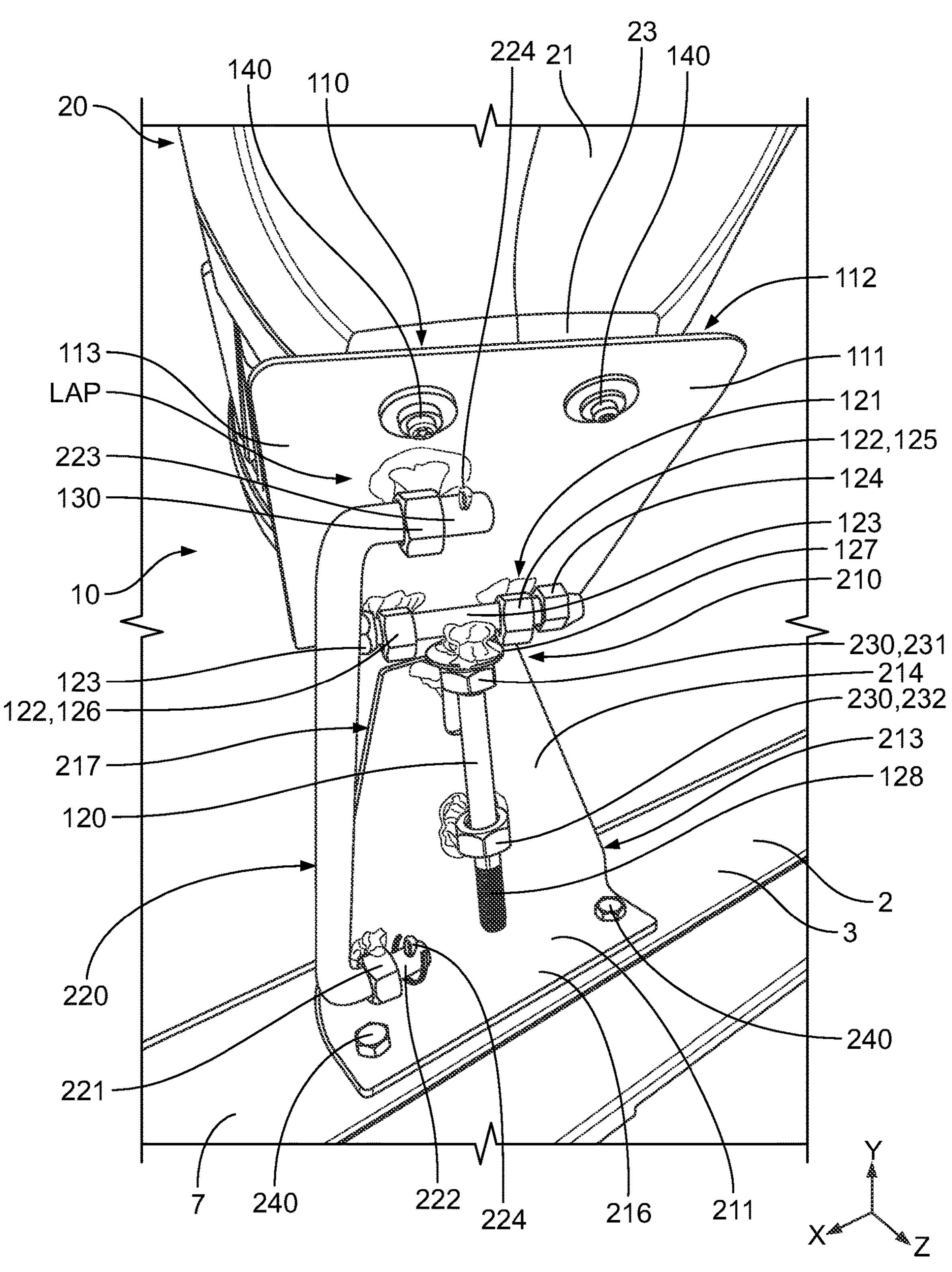
FIG. 6 is a detailed perspective view of the attachment assembly attaching the blower to the mower in a locked attached position.

A mower 1 according to an embodiment, as shown in FIG. 1, comprises a frame 2. The frame 2 comprises a front bar 3 having a top front bar surface 7, as shown in FIGS. 4-6. The mower 1 is a motorized vehicle operated by a user. The mower 1 may have a deck having a blade cutter and, optionally, a vacuum. The mower may be operated by the user, for example, to cut various plants such as grass and to collect plant debris.

A coordinate system is provided in the Figures for ease of understanding the attachment assembly 10. The coordinate system comprises a vertical axis Y, a horizontal axis X perpendicular to the vertical axis Y, and a longitudinal axis Z. The longitudinal axis Z is perpendicular to the vertical axis Y and the horizontal axis X.

The attachment assembly 10 is now described with reference to FIGS. 1-6. The attachment assembly 10 according to an embodiment shown in FIGS. 1-6 comprises a plate 110 and a bracket 210.

As shown in FIGS. 2-3 and 5-6, the plate 110 comprises a front plate surface 111, a back plate surface 112 opposite the front plate surface 111 along the vertical axis Y, and a plate body 113. The plate 110 comprises a plate pin 120, a pivot assembly 121, a plate securing device passageway 130, and a plurality of plate fasteners 140.

In the embodiment shown in FIGS. 1-3 and 5-6, the plate 110 has an approximately rectangular shape. In various other embodiments, the plate 110 may have an approximately square shape, an approximately circular shape, or any other shape that allows the elements to function as described herein. The plate 110 of the present embodiment is rigid and made of a steel material. In various other embodiments the plate 110 may be rigid and made of an aluminum material, a rigid polymer material, a composite material, or any other rigid materials that allow the elements to function as described herein. In another embodiment, the plate 110 is semi-flexible and made of a semi-flexible polymer material. In the present disclosure "semi-flexible" is intended to mean that a material can elastically deform at least 10% from its original shape without permanently deforming.

As shown in FIGS. 2-3 and 5-6, the plate pin 120 extends from the plate 110 along the vertical axis Y. In the present embodiment the plate pin 120 is fixedly attached to the plate 110 by the pivot assembly 121 as described in more detail below. When the plate pin 120 is fixedly attached to the pivot assembly 121, the plate pin 120 is rotatable approximately 180 degrees about the vertical axis Y. Throughout the specification, the term "approximately" is intended to mean within 10% of the described numerical value or the described numerical ends of the range. In another embodiment, the plate pin 120 is releasably connectable or threadably connectable to the pivot assembly 121. In all embodiments, however, the plate pin 120 is rotatable at the pivot assembly 121.

The plate pin 120 of the present embodiment, as shown in FIGS. 2-3 and 5-6, is a partially threaded rod with a plate pin flange end 127 and a plate pin threaded end 128 having an external thread. In various other embodiments, the plate pin 120 may be a partially threaded rod without a flange, a fully threaded rod, or any other type of fastener known to those with ordinary skill in the art and capable of fastening the elements described herein. In another embodiment, the plate pin 120 has no thread and is releasably connectable or fixedly attachable to the plate pin passageway 230, as described in more detail below, in anyway known to those with ordinary skill in the art that allows the elements to function as described herein.

The pivot assembly 121 of the present embodiment, as shown in FIGS. 2-3 and 5-6, is fixedly attached to front surface 111 of the plate 110, for example, with a heat weld. The pivot assembly 121 comprises a pivot assembly passageway 122, a pivot assembly pin 123, and a pivot assembly pin locking device 124.

As shown in FIGS. 2-3 and 5-6, the pivot assembly passageway 122 is fixedly attached to the front plate surface 111 of the plate 110, for example with a heat weld. The pivot assembly passageway 122 extends from the front plate surface 111 along the vertical axis Y. In various embodiments, the pivot assembly passageway 122 may be fixedly attachable, releasably connectable, or threadably connectable to the front plate surface 111 of the plate 110 in any way that allows the elements to function as described herein. In the present embodiment, the pivot assembly passageway 122 comprises a first plate section 125, and a second plate section 126. Each of the plate sections 125, 126 has an approximately hexagonal outer shape having an approximately circular passageway. The circular passageway of the plate sections 125, 126 have internal threads extending along the horizontal axis X. The thread in each of the plate sections 125, 126 is complementary to the exterior thread of the pivot assembly pin 123 described in more detail below. In another embodiment, the pivot assembly passageway 122 is a fixedly attached part of a monolithically formed plate 110.

As shown in FIGS. 2-3 and 5-6, the pivot assembly passageway 122 of the present embodiment comprises two hex nuts, each hex nut respectively being the plate section 125 or the plate section 126. In another embodiment the pivot assembly passageway 122 is a coupling nut with an interior thread complementary to the exterior thread of the pivot assembly pin 123 as described in more detail below. In other embodiments, the pivot assembly passageway 122 is any other type of fastener known to those with ordinary skill in the art and capable of fastening the elements described herein. In yet another embodiment, the pivot assembly passageway 122 has no thread and is releasably connectable or fixedly attachable to the pivot assembly pin 123 in anyway known to those with ordinary skill in the art that allows the elements to function as described herein.

As shown in FIGS. 2-3 and 5-6, the pivot assembly pin 123 is fixedly attached to the pivot assembly 121 by the plate pin 120 and/or the pin locking device 124 as described in more detail below. The pivot assembly pin 123 is insertable into the pivot assembly passageway 122 along the horizontal axis X. The pivot assembly pin 123 has an exterior thread that is threadably connectable to the complementary internal thread of the pivot assembly passageway 122. As shown in FIGS. 2-3 and 5-6, the pivot assembly pin 123 cannot be uninserted from the plate section 126 of the pivot assembly passageway 122 when the plate pin 120 is fixedly attached to the pivot assembly pin 123. The plate pin 120 of the present embodiment is heat welded to the pivot assembly pin 123. In various other embodiments the plate pin 120 is fixedly attached in anyway known to those of ordinary skill in the art and capable of fixedly attaching the elements as described herein.

The pin locking device 124, as shown in FIGS. 2-3 and 5-6, prevents the pivot assembly pin 123 from being fully unthreaded from the plate section 125 of the pivot assembly passageway 122. In the present embodiment, the pin locking device 124 is a nut with one open end and one closed end with internal thread complementary to the exterior thread of the pivot assembly pin 123. In various other embodiments, the pin locking device 124 may be fixedly attached to the pivot assembly pin 123 with a heat weld.

The plate securing device passageway 130, as shown in FIGS. 2-3 and 5-6, is fixedly attached to the front plate surface 111 of the plate 110 with a heat weld. The plate securing device passageway 130 extends from the front plate surface 111 along the vertical axis Y. In various embodiments, the plate securing device passageway 130 may be fixedly attachable, releasably connectable, or threadably connectable to the front plate surface 111 of the plate 110 by anyway known to those of ordinary skill in the art that allows the elements to function as described herein. The plate securing passageway 130 has an approximately hexagonal outer shape having an approximately circular passageway. The circular passageway of the plate securing passageway 130 has internal thread extending along the horizontal axis X. In another embodiment the plate securing passageway 130 is a fixedly attached part of a monolithically formed plate 110. In the present embodiment, the plate securing passageway 130 is a hex nut. In various other embodiments the plate securing passageway 130 has any outer shape with any shape passageway, with or without thread, that allows the elements to function as described herein.

As shown in FIGS. 2-3 and 5-6, the plurality of plate fasteners 140 threadably connect the plate 110 to the blower 20 as described in more detail below. In the present embodiment, the plurality of plate fasteners 140 are screws. In other embodiments, the plurality of plate fasteners 140 may be any other type of fastener known to those with ordinary skill in the art and capable of fastening the elements described herein. In another embodiment, the plate 110 does not have the plurality of plate fasteners 140. In the embodiment without the plurality of plate fasteners 140, the plate 110 is fixedly attached to the blower 20 with a chemical weld or adhesive as described in more detail below.

As shown in FIGS. 4-6, the bracket 210 comprises a bracket body 217. The bracket body 217, as shown in FIGS. 4-6, comprises a flat portion 216 having a top bracket surface 211, and a bottom bracket surface 212 opposite the top bracket surface 211 along the vertical axis Y, and a perpendicular portion 213 perpendicular to the flat portion 216 along the vertical axis Y. The bracket 210 also comprises a plate securing device 220, a bracket passageway 221, the plate pin passageway 230, and a plurality of bracket fasteners 240.

As shown in FIGS. 4-6, the bracket body 217 of the bracket 210 of the present embodiment is a monolithically formed angle bracket. The bracket body 217 has a bend at an approximately right angle. The bracket body 217 of the present embodiment is rigid and made of a steel material. In various other embodiments the bracket body 217 may be rigid and made of an aluminum material, a rigid polymer material, a composite material, or any other rigid materials that allow the elements to function as described herein. In another embodiment, the bracket body 217 is semi-flexible and made of a semi-flexible polymer material.

The perpendicular portion 213, as shown in FIGS. 4-6, has a front perpendicular portion surface 214 and a back perpendicular portion surface 215 opposite the front perpendicular portion surface 214 along the longitudinal axis Z.

The plate securing device 220, as shown in FIGS. 4-6, has an approximately U-shape with a first bent end 222 and the second bent end 223 opposite the first bent end 222 along the vertical axis Y. In another embodiment, the plate securing device 220 has an approximately upside-down L shape. The plate securing device 220 in the present embodiment, as shown in FIG. 4, is a piece of rebar with two ends bent in an approximately right angle, each of the bent ends being the first bent end 222 or the second bent end 223. The plate securing device 220 is releasably connectable to the front perpendicular portion surface 214 of the bracket body 217 by the bracket passageway 221 as described in more detail below.

In another embodiment, a height of the plate securing device 220 is adjustable. In the embodiment where the plate securing device 220 has the adjustable height the plate securing device 220 is a pair of rods with pin adjustable height, one of the rods has a smaller diameter than the other rod and sits inside of the other rod. In various embodiments, the plate securing device 220 is fixedly attached to the bracket body 217 of the bracket 210 or threadably connectable to the bracket body 217 in anyway known to those of ordinary skill in the art that allows the elements to function as described herein.

As shown in FIG. 4, each of the first bent end 222 and the second bent end 223 have a length of approximately 20% of a length of a straight portion of the plate securing device 220. Each of the first bent end 222 and the second bent end 223 have a bent end through hole that extends through each of the first bent end 222 and the second bent end 223 along the vertical axis Y. In the present embodiment, as shown in FIG. 4, a bent end pin 224 is placeable through each of the bent end through holes of the first bent end 222 and the second bent end 223 to releasably connect the plate securing device 220 to the bracket passageway 221 and the plate securing device passageway 130 as described in more detail below. In various other embodiments the bent end pin 224 may be a spring pin, a quick release pin, a cotter pin, or any other type of pin known to those of ordinary skill in the art that allows the elements to function as described herein.

The bracket passageway 221, as shown in FIGS. 4-6, is fixedly attached to the front perpendicular portion surface 214 of the perpendicular portion 213 of the bracket body 217, for example, with a heat weld. The bracket passageway 221 extends from the front perpendicular portion surface 214 along the longitudinal axis Z. In various embodiments, the bracket passageway 221 may be fixedly attachable, releasably connectable, or threadably connectable to the perpendicular portion surface 214 by any way known to those of ordinary skill in the art that allows the elements to function as described herein. The bracket passageway 221 has an approximately hexagonal outer shape having an approximately circular passageway. The circular passageway of the bracket passageway 221 has thread extending along the horizontal axis X. In another embodiment the bracket passageway 221 is a fixedly attached part of a monolithically formed bracket body 217. In the present embodiment the bracket passageway 221 is a hex nut. In various other embodiments the bracket passageway 221 has any outer shape with any shape passageway with or without thread that allows the elements to function as described herein.

As shown in FIGS. 4-6, the plate securing device 220 is releasably connectable to the bracket body 217 of the bracket 210 by the bracket passageway 221. The first bent end 222 of the plate securing device 220 is insertable into the bracket passageway 221 along the horizontal axis X. Once the first bent end 222 is inserted into the bracket passageway 221, the bent end pin 224 is insertable through the bent end through hole of the first bent end 222 of the plate securing device 220, thereby releasably connecting the plate securing device 220 to the bracket body 217 of the bracket 210.

As shown in FIGS. 4-6, the plate pin passageway 230 is fixedly attached to the front perpendicular portion surface 214 of the bracket body 217, for example, with a heat weld. The plate pin passageway 230 extends from the front perpendicular portion surface 214 along the longitudinal axis Z. In various embodiments the plate pin passageway 230 may be releasably connectable or threadably connectable to the front perpendicular portion surface 214 of the bracket body 217. In the present embodiment, the plate pin passageway 230 comprises a first bracket section 231 and a second bracket section 232. Each of the bracket sections 231, 232 has an approximately hexagonal outer shape having an approximately circular passageway. The circular passageway of the bracket sections 231, 232 of the plate pin passageway 230 have internal threads extending along the vertical axis Y. The thread in each of the bracket sections 231, 232 is complementary to the exterior thread of the plate pin 120 described above. In another embodiment, the plate pin passageway 230 is a fixedly attached part of the monolithically formed bracket body 217.

As shown in FIGS. 4-6, the plate pin passageway 230 comprises two hex nuts, each hex nut being the first bracket section 231 or the second bracket section 232. In another embodiment, the plate pin passageway 230 has a single bracket section that is a coupling nut with an interior thread complementary to the exterior thread of the plate pin 120 as described above. In yet another embodiment, the plate pin passageway 230 has no thread and is releasably connectable or fixedly attachable with the plate pin 120 in anyway known to those with ordinary skill in the art that allows the elements to function as described herein.

As shown in FIGS. 4-6, the plurality of bracket fasteners 240 connect the bracket body 217 of the bracket 210 to the frame 2 as described in more detail below. In the present embodiment, the plurality of bracket fasteners 240 are hex bolts. In other embodiments, the plurality of bracket fasteners 240 may be any other type of fastener known to those with ordinary skill in the art and capable of fastening the elements described herein. In another embodiment, the bracket 210 does not have the plurality of bracket fasteners 240. In the embodiment without the plurality of bracket fasteners 240 the bracket body 217 of the bracket 210 is fixedly attached to the frame 2 with a heat weld.

The attachment assembly 10 will now be described according to another embodiment shown in FIG. 7. The embodiment shown in FIG. 7 comprises the plate 110 and the bracket 210, and all the connections thereto, as described above. The embodiment as shown in FIG. 7 also includes an upright post 310.

Figure 7:
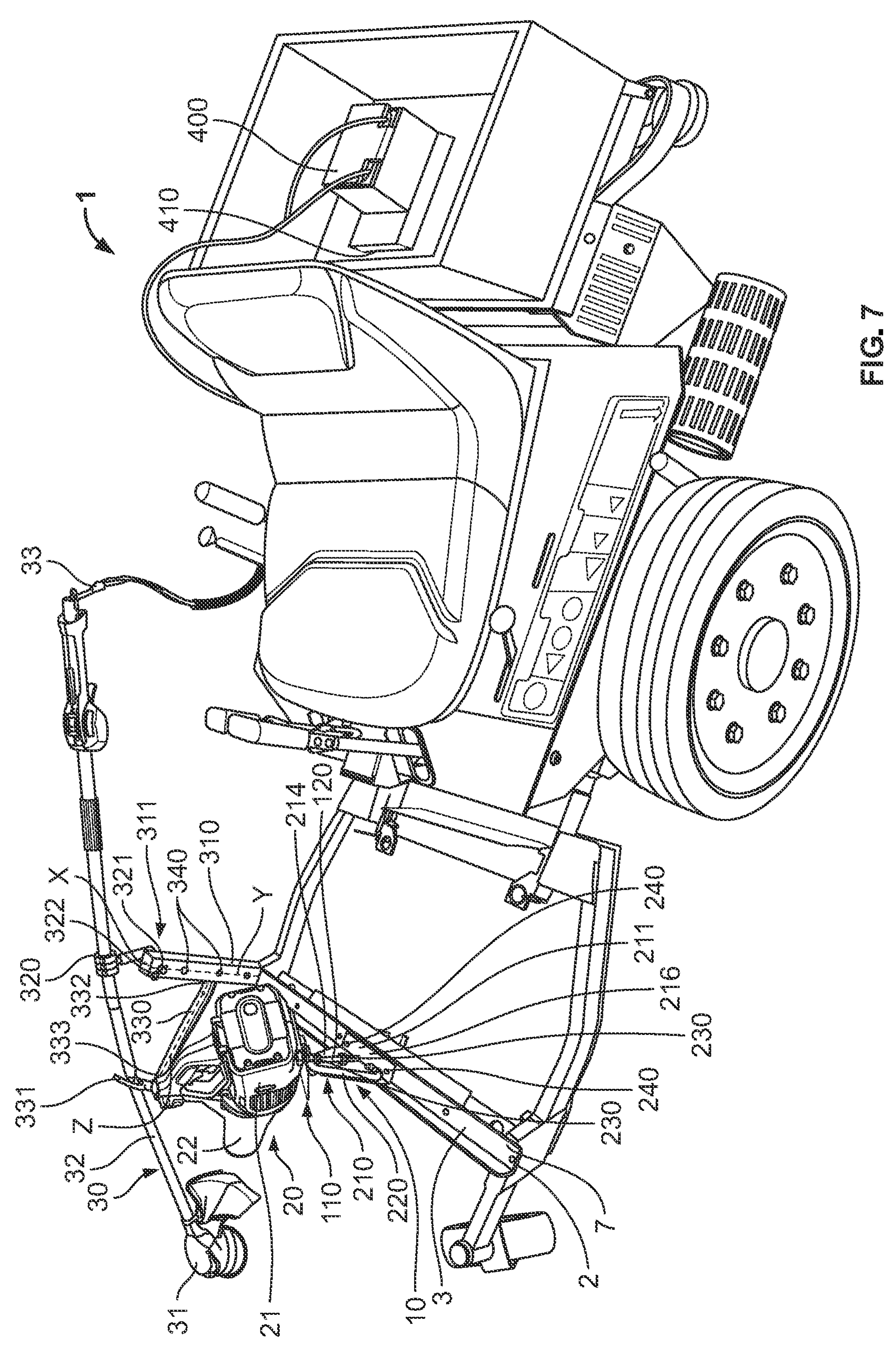
FIG. 7 is a perspective view of another embodiment of an attachment assembly attaching a blower and a string trimmer to a mower.

As shown in FIG. 7, the upright post 310 comprises a post attachment assembly 311. The post attachment assembly 311 comprises a rotatable clamp 320, a retention arm 330, and a plurality of post attachment holes 340.

In the embodiment shown in FIG. 7, the upright post 310 has an approximately square shape. In various embodiments, the upright post 310 may have an approximately rectangular shape, an approximately circular shape, or any other shape that allows the elements to function as described herein. The upright post 310 of the present embodiment is rigid and made of a steel material. In various other embodiments the upright post 310 may be rigid and made of an aluminum material, a rigid polymer material, a composite material, or any other rigid materials that allow the elements to function as described herein. In another embodiment, the upright post 310 is semi-flexible and made of a semi-flexible polymer material.

The upright post 310, as shown in FIG. 7, is fixedly attached to the frame 2 with a heat weld. In another embodiment the upright post 310 is removably attachable to the front bar top surface 7 with a plurality of fasteners.

As shown in FIG. 7, the rotatable clamp 320 is releasably attachable to a string trimmer 30 with a clamp. The rotatable clamp 320 comprises two halves that are tightened or loosened with a plurality of fasteners that are disposed around a shaft 32 of the string trimmer 30. The rotatable clamp 320 allows the string trimmer 30 to rotate about the vertical axis Y, the horizontal axis X, and the longitudinal axis Z. The rotatable clamp 320 is releasably attachable to the upright post 310 by the clamp pin 321 as described in greater detail below.

The clamp pin 321, as shown in FIG. 7, is insertable into each of the plurality of post attachment holes 340 along the horizontal axis X. The clamp pin 321 has a clamp pin through hole that extends through the clamp pin 321 along the vertical axis Y. A clamp pin securing pin 322 is placeable through the clamp pin through hole to releasably connect the rotatable clamp 320 to the post attachment assembly 311 of the upright post 310. In various other embodiments the clamp pin securing pin 322 may be a spring pin, a quick release pin, a cotter pin, or any other type of pin known to those of ordinary skill in the art that allows the elements to function as described herein.

As shown in FIG. 7, the rotatable clamp 320 is releasably connectable with the upright post 310 by the plurality of post attachment holes 340. The clamp pin 321 of the rotatable clamp 320 is insertable into each of the plurality of post attachment holes 340 along the horizontal axis X. Once the clamp pin 321 is inserted into one of the plurality of post attachment holes 340 the clamp pin securing pin 322 is insertable through the clamp pin through hole of the clamp pin 321 of the rotatable clamp 320, thereby releasably connecting the rotatable clamp 320 to the upright post 310.

The retention arm 330, as shown in FIG. 7, has a first retention arm end 332 and a second retention arm end 333 opposite the first retention arm end 332 along the longitudinal axis Z, and a U-shaped member 331. The retention arm 330 is an approximately rectangular shape and extends from the upright post 310 along the longitudinal axis Z. The retention arm 330 is fixedly attached to the upright post 310 by the first retention arm end 332, for example, with a heat weld. In various other embodiments, the retention arm 330 is fixedly attached or releasably connectable to the upright post 310 in anyway known to those of ordinary skill in the art and capable of fixedly attaching the elements as described herein.

As shown in FIG. 7, the U-shaped member 331 is fixedly attached to the second retention arm end 333 of the retention arm 330. The U-shaped member 331 is sized to allow the string trimmer shaft 32 of the string trimmer 30 to sit inside the U-shaped member 331 as described in more detail below.

The plurality of post attachment holes 340, as shown in FIG. 7, are spaced apart from one another along the vertical axis Y. Each of the plurality of post attachment holes 340 extend through the upright post 310 along the horizontal axis X. Each of the plurality of post attachment holes 340 can be used to releasably connect the rotatable clamp 320 to the upright post 310 as described above.

For ease of understanding the attachment assembly 10, exemplary landscaping devices, namely the blower 20 and the string trimmer 30, are described as being attached to the attachment assembly 10. However, various other landscaping devices can be attached using the attachment assembly 10, such as: (1) a spreader for seeds, fertilizer, salt, mulch, etc.; (2) a pesticide dispenser or sprayer; (3) a weed killer dispenser or sprayer; and (4) a vacuum for vacuuming cut grass, cut weeds, leaves, dirt, etc. While various landscaping devices are listed above, landscaping devices are not to be construed as limited by the above exemplary devices and can include any device.

As shown in FIGS. 1-3 and 5-6, the blower 20 is threadably connectable to the mower 1 using the plate 110 and the bracket 210 of the attachment assembly 10. The blower 20 comprises a blower body 21 and a blower tube 22. The blower body 21 comprises a motor, a fan, and a bottom blower surface 23. The blower fan, powered by the blower motor, directs air through the blower tube 22 when a blower trigger is actuated by the user. The bottom blower surface 23 of the blower body 21 has a plurality of holes for receiving the plurality of plate fasteners 140 as described in more detail below.

As shown in FIG. 7, the string trimmer 30 comprises a trimming head 31, the string trimmer shaft 32, and an energy input 33. The string trimmer 30 is attachable to the mower using the post attachment assembly 311 of the upright post 310 of the attachment assembly 10.

The string trimmer 30 is operable by the user and, in an embodiment, is powered by an external battery 400 attached to the mower 1. The external battery 400 and the string trimmer 30 are electrically connected by the energy input 33.

The energy input 33 of the present embodiment is an electrical connector having wiring. The external battery 400 is releasably connected on a back and/or on a cargo tray of the mower 1 with a clamp. A vibration limiting element 410 may be disposed under the external battery 410 to limit vibration while the external battery 400 is releasably connected to the mower 1. The vibration limiting element 410 of the present embodiment is a rubber material or a closed-cell extruded polystyrene foam. The vibration limiting element 410 is not to be construed as limited by the above exemplary materials and can be any material that limits vibration.

Operational aspects of the embodiment of the attachment assembly 10 shown in FIGS. 1-6 are now described.

As shown in FIGS. 2-3 and 5-6, the plate 110 is connected to the bottom blower surface 23 of the blower 20 by the plurality of plate fasteners 140. To attach the plate 110 to the blower 20, the back plate surface 112 is placed in contact and aligned with a complementary portion of the bottom blower surface 23. Once the plate 110 and the bottom blower surface 23 are in contact and aligned with one another, the plurality of plate fasteners 140 pass through the plate body 113 and the bottom blower surface 23 along the vertical axis Y and thread into a complementary portion of the blower body 21 of the blower 20, thereby threadably connecting the plate 110 to the blower 20. In another embodiment, the plate 110 is fixedly attached to the bottom blower surface 23 of the blower 20 with a chemical weld or an adhesive such as an epoxy or E600. The plate 110 attached to the blower 20 with the plate fasteners 140 as described above is hereinafter referred to as the "plate blower assembly."

As shown in FIGS. 4-6, the bracket body 217 of the bracket 210 is threadably connected to the top front bar surface 7 of the top front bar 3 of the frame 2 of the mower 1 by the plurality of bracket fasteners 240. To attach the bracket body 217 to the top front bar surface 7, the bottom bracket surface 212 is placed in contact and aligned with a complementary portion of the top front bar surface 7. Once the bottom bracket surface 212 and the top front bar surface 7 are in contact and aligned with one another, the plurality of bracket fasteners 240 pass through the flat portion 216 of the bracket body 217 and the top front bar surface 7 along the vertical axis Y and thread into a hex nut and/or a complementary portion of the front bar 3 of the frame 2 of the mower 1, thereby threadably connecting the bracket body 217 of the bracket 210 to the mower 1. In another embodiment, the bracket body 217 is fixedly attached to the top front bar surface 7 of the front bar 3 of the frame 2, for example, with a heat weld.

Once the bracket 210 is attached to the mower 1 as described above, the plate blower assembly can be attached to the bracket 210, thereby attaching the plate blower assembly to the mower 1. The plate blower assembly is threadably connectable to the plate pin passageway 230 of the bracket 210 with the plate pin 120. To threadably connect the plate pin 120 to the plate pin passageway 230, the plate pin 120 is first aligned with the plate pin passageway 230. As shown in FIG. 5, once the plate pin passageway 230 and the plate pin 120 are aligned, the plate pin threaded end 128 is threadably connected to both the bracket section 231 and the bracket section 232 of the plate pin passageway 230 in a first rotational direction FR. The first rotational direction FR is a clockwise rotational direction about the vertical axis Y. The plate pin 120 is removable from the plate pin passageway 230 in a second rotational direction SR. The second rotational direction SR is a counter-clockwise rotational direction about the vertical axis Y. A height of the plate blower assembly, as measured from the ground to the front plate surface 111 of the plate 110, in a locked attached position LAP is adjustable by moving the plate pin 120 in the first rotational direction FR or the second rotational direction SR when the plate blower assembly is in an open attached position OAP.

As shown in FIG. 5, the plate blower assembly is pivotable with respect to the bracket 210 about the vertical axis Y and about the horizontal axis X in the open attached position OAP. When the plate blower assembly and the bracket 210 are in the open attached position OAP the user can pivot the plate blower assembly to any desired position about the vertical axis Y and about the horizontal axis X. The plate blower assembly is pivotable about the vertical axis Y by pivoting the plate pin 120 with the pivot assembly 121. The plate blower assembly is pivotable about the horizontal axis X by pivoting the plate pin 120 in the first rotational direction FR or the second rotational direction SR.

As shown in FIG. 6, the plate blower assembly is not pivotable with respect to the bracket 210 about the vertical axis Y, the horizontal axis X, or the longitudinal axis Z in the locked attached position LAP. When the user has pivoted the plate blower assembly to a desired rotational position about the vertical axis Y and about the horizontal axis X, the user can fix the plate blower assembly at that rotational position by placing the plate blower assembly and the bracket 210 in the locked attached position LAP.

The plate blower assembly is in the locked attached position LAP, as shown in FIG. 6, when the plate securing device 220 is releasably connected to the plate securing device passageway 130 of the plate 110. The second bent end 223 of the plate securing device 220 is insertable into the plate securing device passageway 130 along the horizontal axis X. Once the second bent end 223 is inserted into the plate securing device passageway 130 the bent end pin 224 is insertable through the bent end through hole of the second bent end 223 of the plate securing device 220, thereby preventing the plate blower assembly from pivoting and releasably connecting the plate securing device 220 to the plate 110 in the locked attached position LAP.

Operational aspects of the embodiment of the attachment assembly 10 shown in FIG. 7 are now described.

The operational aspects of the plate 110, the bracket 210, and the blower 20 of the attachment assembly shown in FIG. 7 are identical to the operational aspects of those elements for the embodiment shown in FIGS. 1-6.

As shown in FIG. 7, the upright post 310 is fixedly attached to the top front bar surface 7 of the top front bar 3 of the frame 2 of the mower 1 by a heat weld. The upright post 310 is attached adjacent to the bracket 210 on the frame 2 of the mower 1. To attach the upright post 310 to the top front bar surface 7 a bottom post surface of the upright post 310 is placed in contact and aligned with a respective portion of the top front bar surface 7. Once the bottom post surface and the top front bar surface 7 are in contact and aligned with one another, the heat weld can be created, thereby fixedly attaching the upright post 310 to the mower 1.

Once the upright post 310 is attached to the mower 1 as described above, the string trimmer 30 can be attached to the mower 1 by the rotatable clamp 320 as described above. Once the string trimmer 30 is attached to the mower 1 by the post attachment assembly 311 of the upright post 310, the string trimmer 30 can be operated by the user at the same time the user operates the mower 1. Once the user is done using the string trimmer 30, the user can rest the string trimmer 30 in the U-shaped member 331 of the retention arm 330. If necessary, the user can adjust a height of the string trimmer 30 (by changing which of the plurality of post attachment holes 340 the clamp pin 321 is inserted into) in order to rest the string trimmer 30 in the U-shaped member 331.

One possible locked attached position LAP is shown in FIG. 7. As shown in FIG. 7, the blower 20 is in a locked attached position LAP where the blower tube 22 is directed toward the string trimmer 30. In this locked attached position LAP, the air directed through the blower tube 22 will blow grass that is, for example, cut by the string trimmer 30.

The mower 1 typically cannot cut various plants near lawn edges or objects such as fences, gates, and walls, without damaging the mower 1 or the objects. As such, additional users and/or the user operating the mower 1 may have to use the string trimmer 30 to cut the various plants near lawn edges and the objects, thereby taking longer to cut the various plants than if the mower 1 alone could be used, and/or requiring additional users to operate the string trimmer 30 while another user operates the mower 1. Using the attachment assembly 10 will make the mower 1 more versatile by attaching one or more of the plurality of landscaping devices to the mower 1 using the attachment assembly 10. When the mower 1 has the attachment assembly 10 the mower 1 is capable of cutting the plants near the lawn edges and the objects, thereby saving time and/or requiring less labor.

What is claimed is:

1. An attachment assembly for attaching a blower to a mower comprising:

- a plate fixed to the blower, the plate has a plate pin attached to the plate and extending from the plate; and
- a bracket having a bracket body attached to a frame of the mower, a plate securing device, and a plate pin passageway, the plate pin is releasably connected to the bracket body by the plate pin passageway in an open attached position, the plate is pivotable with respect to the bracket about a vertical axis and about a horizontal axis extending perpendicular to the vertical axis in the open attached position, the plate pin is rotatable within the plate pin passageway about the vertical axis and the plate is pivotable with respect to the plate pin about the horizontal axis in the open attached position.

2. The attachment assembly of claim 1, wherein the plate has a plate securing device passageway receiving the plate securing device.

3. The attachment assembly of claim 2, wherein the plate securing device fixes the plate in a locked attached position, the locked attached position is a fixed rotational position about the vertical axis and about the horizontal axis.

4. The attachment assembly of claim 3, wherein the bracket has a bracket passageway fixedly attached to the bracket body.

5. The attachment assembly of claim 4, wherein the plate securing device is releasably connectable to the bracket body by the bracket passageway.

6. The attachment assembly of claim 5, wherein the plate is fixed in the locked attached position when the plate securing device is releasably connected to the plate securing device passageway.

7. The attachment assembly of claim 1, wherein the bracket body is L shaped.

8. The attachment assembly of claim 1, wherein the plate pin has a pivot assembly having a pivot assembly passageway and a pivot assembly pin.

9. The attachment assembly of claim 8, wherein the plate pin is attached to the plate by the pivot assembly pin.

10. The attachment assembly of claim 9, wherein the plate pin is rotatable about the vertical axis by the pivot assembly pin, the pivot assembly pin is rotatable in the pivot assembly passageway.

11. An attachment assembly, comprising:

- a plate fixed to a blower, the plate has a plate pin attached to the plate and extending from the plate;
- a bracket having a bracket body attached to a frame of a mower, the plate pin is releasably connected to the bracket body in an open attached position, the plate is pivotable with respect to the bracket about a vertical axis and about a horizontal axis extending perpendicular to the vertical axis in the open attached position; and
- an upright post attached to the frame of the mower having a post attachment assembly, the upright post is attached adjacent to the bracket on the frame of the mower, each of a plurality of landscaping devices are interchangeably releasably connectable to the post attachment assembly.

12. The attachment assembly of claim 11, wherein a string trimmer is one of the landscaping devices interchangeably releasably connectable to the post attachment assembly of the upright post.

13. The attachment assembly of claim 12, further comprising a battery disposed on the mower and connected to the string trimmer and a vibration limiting element disposed between the battery and the mower.

14. The attachment assembly of claim 12, wherein the post attachment assembly of the upright post comprises a rotatable clamp, the rotatable clamp extends from the upright post and is releasably attached to the string trimmer.

15. The attachment assembly of claim 14, wherein the rotatable clamp attaches the string trimmer to the mower while allowing rotation of the string trimmer about the vertical axis, about the horizontal axis, and about a longitudinal axis perpendicular to the vertical axis and the horizontal axis.

16. The attachment assembly of claim 15, wherein the post attachment assembly of the upright post further comprises a retention arm extending from the upright post, the retention arm having a U-shaped retention member at an end, the string trimmer is received in the U-shaped retention member.

17. A mower comprising,

- a frame; and
- an attachment assembly for attaching a blower to the mower comprising:
  - a plate fixed to the blower, the plate has a plate pin attached to the plate and extending from the plate, the plate pin has a pivot assembly having a pivot assembly passageway and a pivot assembly pin, the plate pin is attached to the plate by the pivot assembly pin; and
  - a bracket having a bracket body attached to the frame of the mower, the plate pin is releasably connected to the bracket body in an open attached position, the plate is pivotable with respect to the bracket about a vertical axis and about a horizontal axis extending perpendicular to the vertical axis in the open attached position, the plate pin is rotatable about the vertical axis by the pivot assembly pin, the pivot assembly pin is rotatable in the pivot assembly passageway.

* * * * *